United States Patent
Ker et al.

(10) Patent No.: US 7,755,871 B2
(45) Date of Patent: Jul. 13, 2010

(54) POWER-RAIL ESD PROTECTION CIRCUIT WITH ULTRA LOW GATE LEAKAGE

(75) Inventors: Ming-Dou Ker, Hsinchu (TW); Chin-Hao Chen, Jhonghe (TW); Ryan Hsin-Chin Jiang, Taipei (TW)

(73) Assignee: Amazing Microelectronic Corp., Jhonghe (TW)

( * ) Notice: Subject to any disclaimer, the term of this patent is extended or adjusted under 35 U.S.C. 154(b) by 62 days.

(21) Appl. No.: 11/987,222

(22) Filed: Nov. 28, 2007

(65) Prior Publication Data
US 2009/0135533 A1   May 28, 2009

(51) Int. Cl.
*H02H 9/04*   (2006.01)
(52) U.S. Cl. .......................................... 361/56
(58) Field of Classification Search ............... 361/56, 361/111
See application file for complete search history.

(56) References Cited

U.S. PATENT DOCUMENTS

| | | | | |
|---|---|---|---|---|
| 4,797,899 A * | 1/1989 | Fuller et al. | ................ | 375/219 |
| 5,946,177 A * | 8/1999 | Miller et al. | ................ | 361/56 |
| 6,385,021 B1 * | 5/2002 | Takeda et al. | ................ | 361/56 |
| 6,724,603 B2 * | 4/2004 | Miller et al. | ................ | 361/111 |
| 6,989,979 B1 * | 1/2006 | Tong et al. | ................ | 361/91.1 |
| 2004/0109270 A1 * | 6/2004 | Stockinger et al. | ........... | 361/56 |
| 2006/0050451 A1 * | 3/2006 | Jen-Chou | ................ | 361/56 |
| 2009/0273955 A1 * | 11/2009 | Tseng et al. | ................ | 363/60 |

FOREIGN PATENT DOCUMENTS

CN   1691122 A   4/2004

* cited by examiner

*Primary Examiner*—Jared J Fureman
*Assistant Examiner*—Angela Brooks
(74) *Attorney, Agent, or Firm*—Stites & Harbison, PLLC; Juan Carlos A. Marquez, Esq.

(57) ABSTRACT

An ESD protection circuit including a clamping module and a detecting module is provided. The clamping module is coupled between a positive power line and a negative power line. The detecting module includes a triggering unit, a resistor, and a MOS capacitor. An output terminal of the triggering unit is used for triggering the clamping module. The resistor is coupled between the positive power line and an input terminal of the triggering unit. The MOS capacitor has a first end and a second end. The first end is coupled to the input terminal of the triggering unit. During a normal power operation, a switching terminal of the triggering unit enables the second end of the MOS capacitor to be coupled with the positive power line. Thereby, the gate tunneling leakage is eliminated and the problem of mistriggering is prevented.

9 Claims, 6 Drawing Sheets

POWER-RAIL ESD PROTECTION CIRCUIT WITH ULTRA LOW GATE LEAKAGE

BACKGROUND OF THE INVENTION

1. Field of the Invention

The present invention relates to a power-rail electrostatic discharge (ESD) protection circuit. In particular, the present invention relates to a power-rail ESD protection circuit with ultra-low gate leakage.

2. Description of the Prior Art

In CMOS technology, the device dimension of transistor has been scaled toward the nanometer region. As MOS transistors get smaller and the gate oxide gets thinner, tunneling current through the insulator becomes a non-negligible component with a potential impact on circuit operation and performance. More specifically, the high gate current can render standard ESD power clamps non-functional, necessitating modification to existing circuits to minimize sensitivity to the gate leakage.

A power-rail ESD clamp circuit provides a low-impedance path from VDD to VSS for ESD current. FIG. 1 shows the classic RC-triggered power-rail ESD clamp circuit. Under normal circuit operation conditions, the input end of the inverter has a high voltage level. Accordingly, the output end of the inverter has a low voltage level and the clamping device 12 (i.e. the NMOS) is turned off. Once VDD is zapped by a positive ESD stress with VSS grounded, the input end of the inverter initially has a low voltage level relative to that of VDD. Therefore, the output end of the inverter generates a high voltage level and turns the ESD clamping device 12 on to provide a low-impedance path from VDD to VSS to discharge ESD current.

FIG. 2 shows a classic CR-coupled power-rail ESD clamp circuit. These circuits, or a minor variation of them, have been widely used in ESD protection. Key design parameters for such power supply clamp include the clamped voltage on the VDD pad for various ESD models, the layout area, the current drawn during power-up, the quiescent VDD to VSS leakage current, and the immunity to mistriggering during normal operation conditions.

In the circuits shown in FIG. 1 and FIG. 2, the capacitors are formed with metal-oxide-semiconductor field-effect transistors (MOSFETs). To ensure the clamping device 12 is fully-on for the duration of the ESD event, the RC combination in the detecting circuit 14 must have a time constant greater than a specific value (e.g. 1 μs for human-body ESD model). In practice, this necessitates the use of a large area capacitor. However, from an ESD performance point-of-view, this is a wasted area, as the ESD protection level is mainly determined by the size of the clamping device 12.

For advanced technologies with very thin gate oxide. The thinner gate oxide MOS capacitor gets the smaller capacitor area. The thin gate oxide MOS capacitor in the detecting circuit 14 is associated with significant stand-by power consumption because of the large gate tunneling leakage current. Further, the large gate leakage current of the classic RC-triggered power-rail clamp circuit may cause the clamping device 12 mistriggered. Due to these problems, modified power clamps with a low gate leakage are highly desirable. The requirement for an improved power-rail ESD clamp circuit is not just reduction of the capacitor size, but reduction of the gate leakage current at the same time.

SUMMARY OF THE INVENTION

The main scope of the invention is to provide ESD protection circuits for solving the aforementioned problems. According to the invention, the connecting configuration of this gate oxide MOS capacitor is variable under different operation conditions.

An embodiment according to the invention is an ESD protection circuit including a clamping module and a detecting module. The clamping module is coupled between a positive power line and a negative power line. The detecting module includes a triggering unit, a resistor, and a thin gate oxide MOS capacitor. The triggering unit has an input terminal, an output terminal, and a switching terminal. The output terminal is coupled to and used for triggering the clamping module. The resistor is coupled between the positive power line and the input terminal of the triggering unit. The thin gate oxide MOS capacitor has a first end and a second end. The first end is coupled to the input terminal of the triggering unit.

During a normal power operation, the switching terminal of the triggering unit enables the second end of the MOS capacitor to be coupled with the positive power line. In an ESD event, the switching terminal of the triggering unit enables the second end of the MOS capacitor to be coupled with the negative power line. Thereby, during normal power operations, the gate tunneling leakage is eliminated. Moreover, the problem of mistriggering can be prevented.

The advantage and spirit of the invention may be understood by the following recitations together with the appended drawings.

BRIEF DESCRIPTION OF THE APPENDED DRAWINGS

Figure 4A:
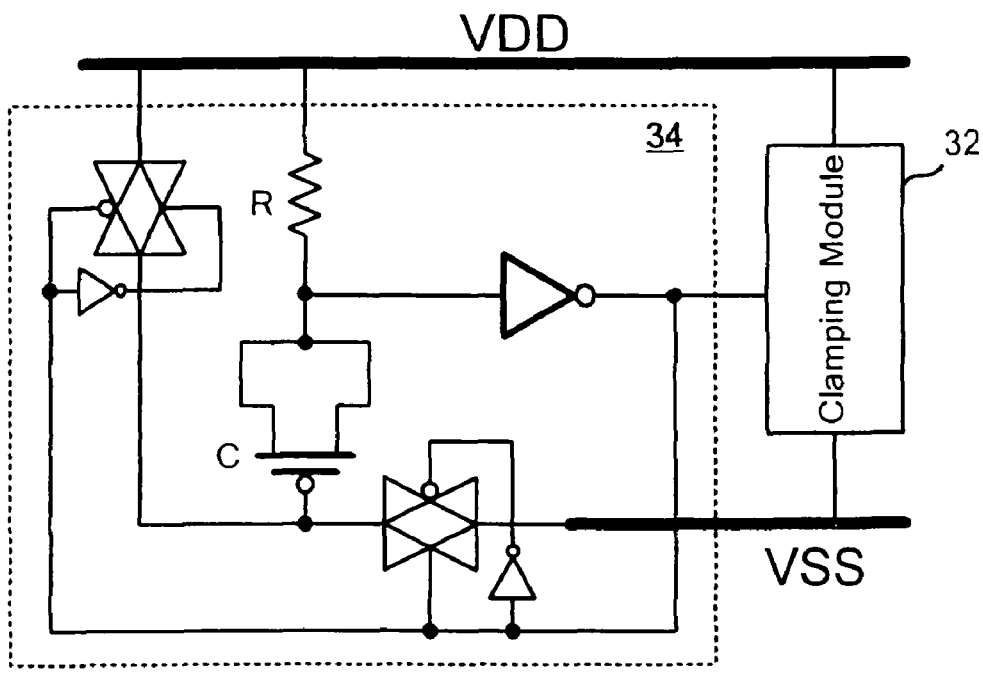
Figure 4B:
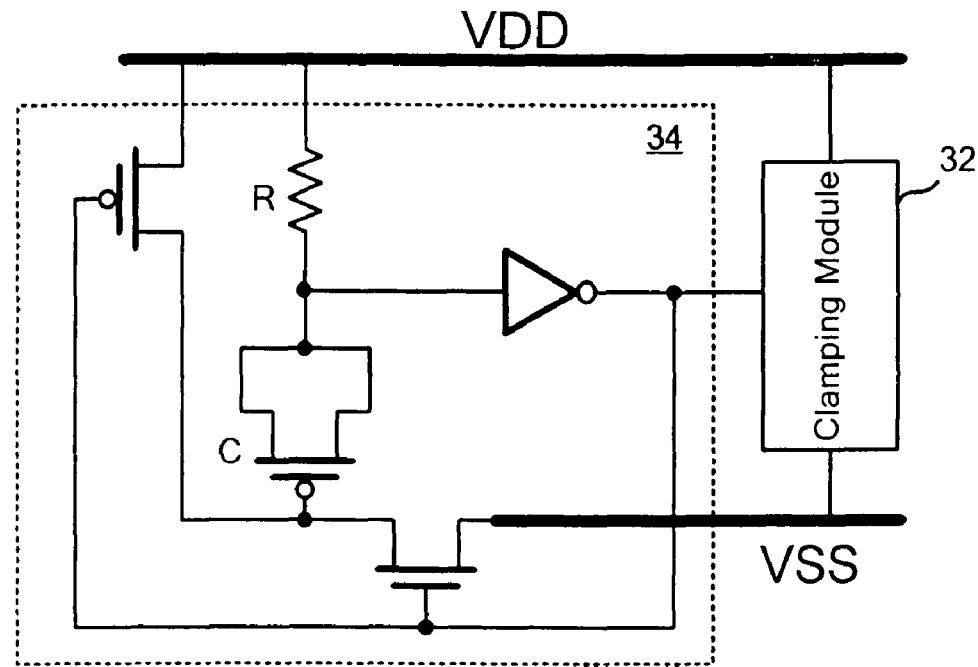

FIG. 4(A) and FIG. 4(B) show exemplary embodiments of the detecting module according to the invention.

Figure 5:
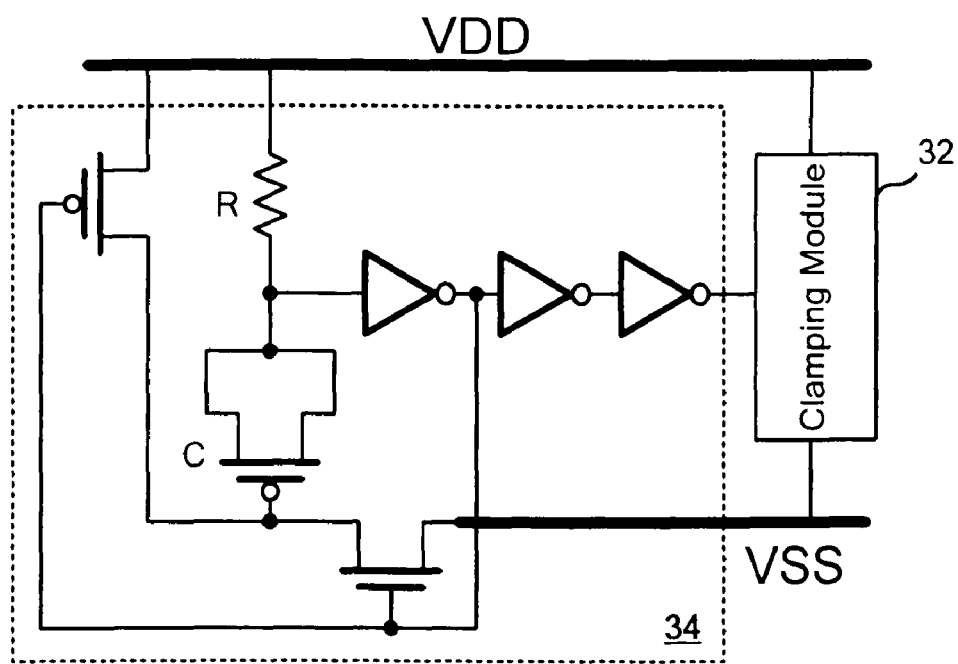
Figure 6:
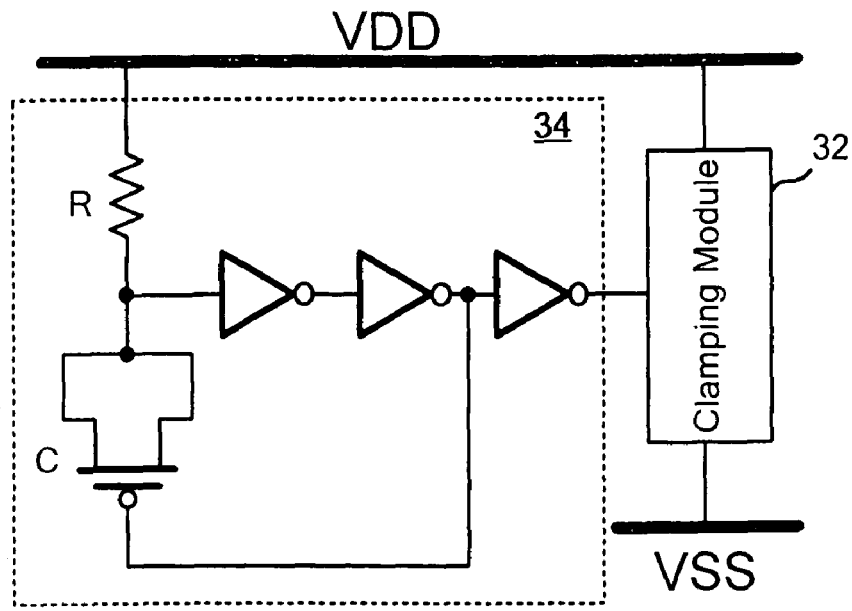

FIG. 5 and FIG. 6 illustrate exemplary triggering units including more inverters.

Figure 7:
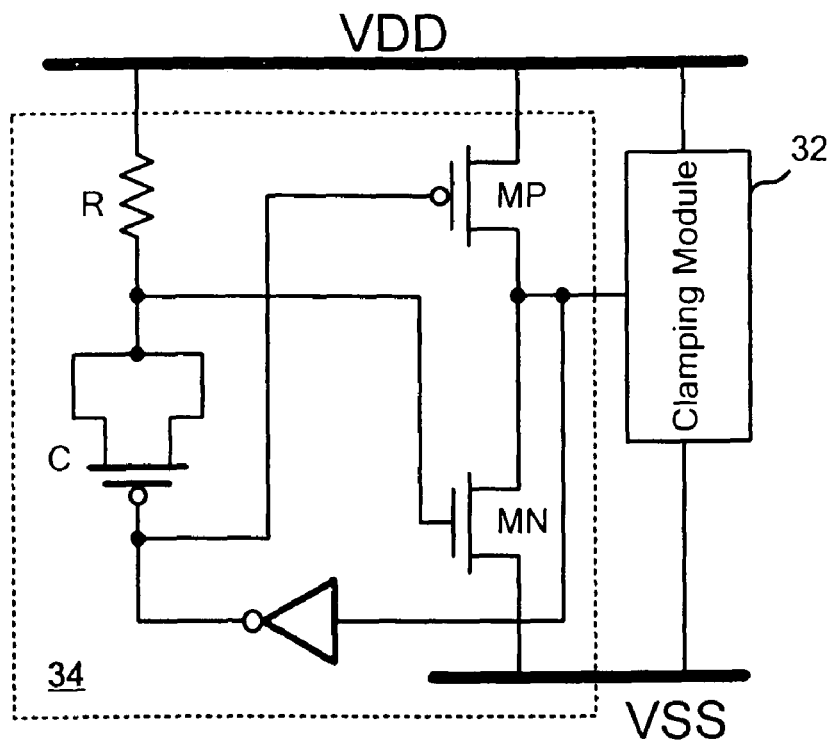
Figure 8:
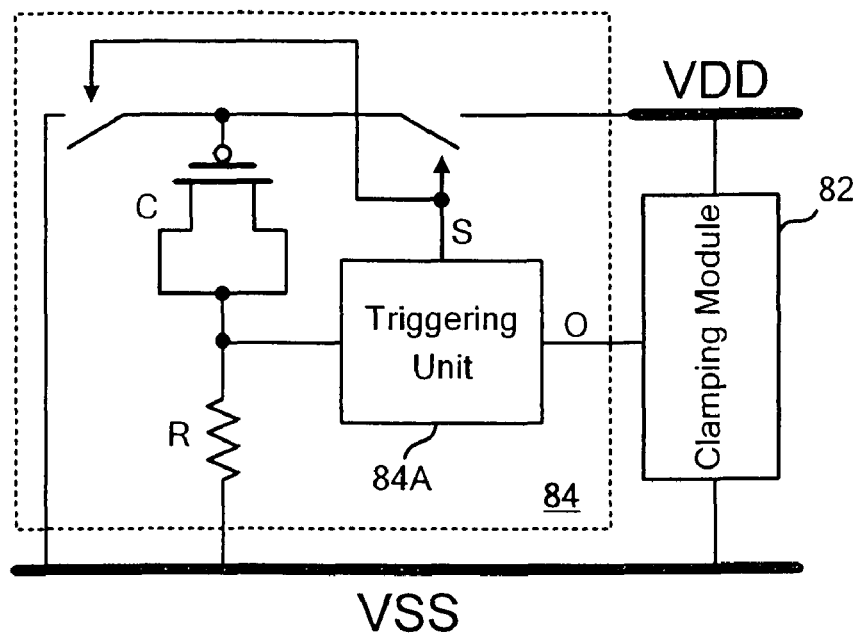

FIG. 7 and FIG. 8 illustrate ESD protection circuits in other embodiments according to the invention.

Figure 9A:
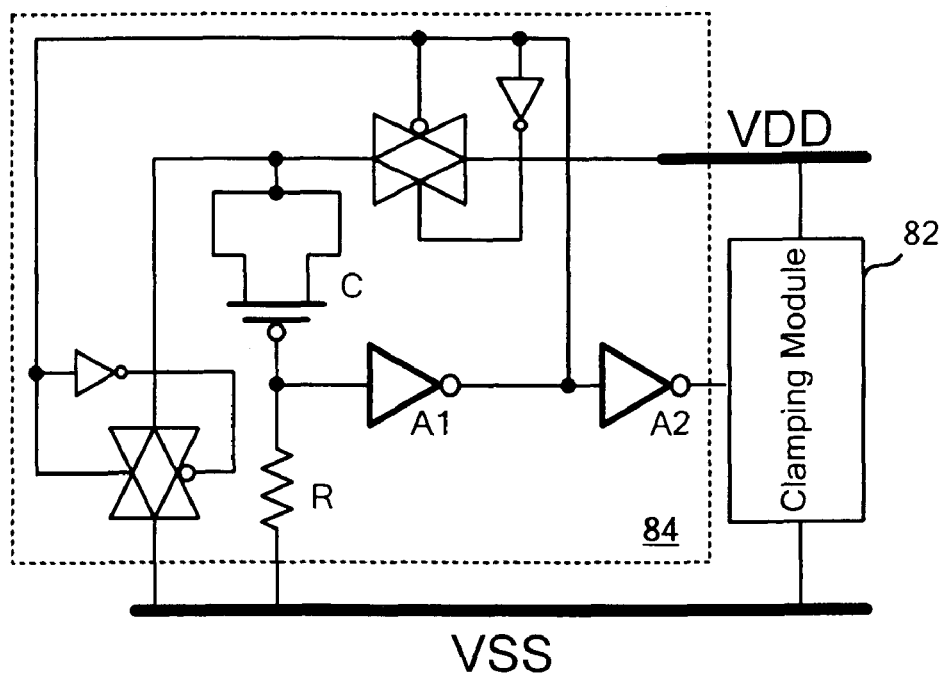
Figure 9B:
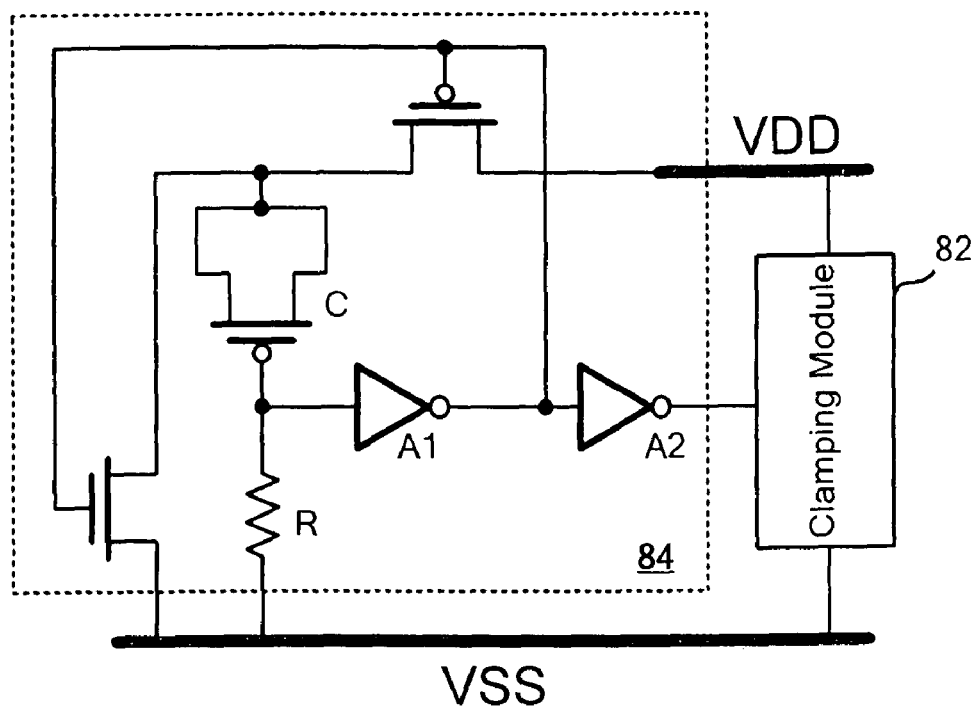

FIG. 9(A) and FIG. 9(B) show exemplary embodiments of the detecting module according to the invention.

Figure 10:
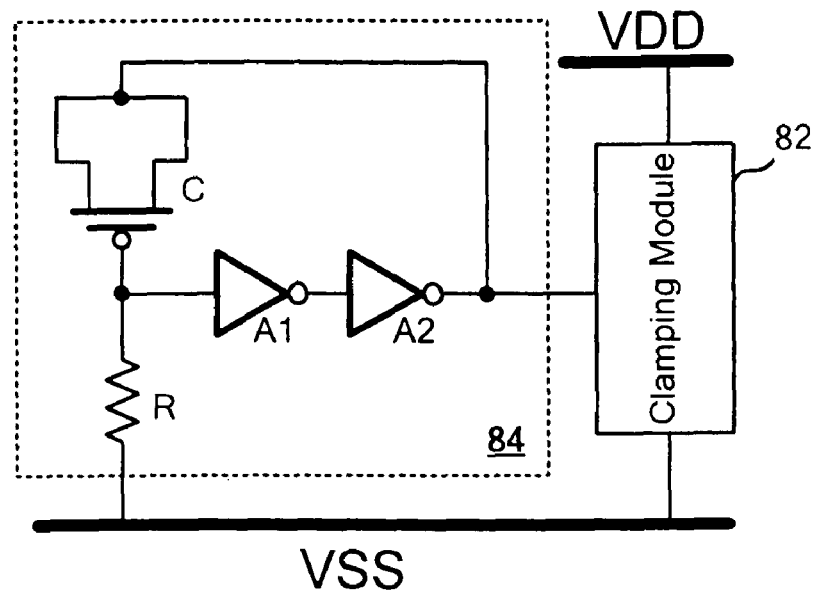

FIG. 10 illustrates a simplified detecting module according to the invention.

DETAILED DESCRIPTION OF THE INVENTION

Figure 3:
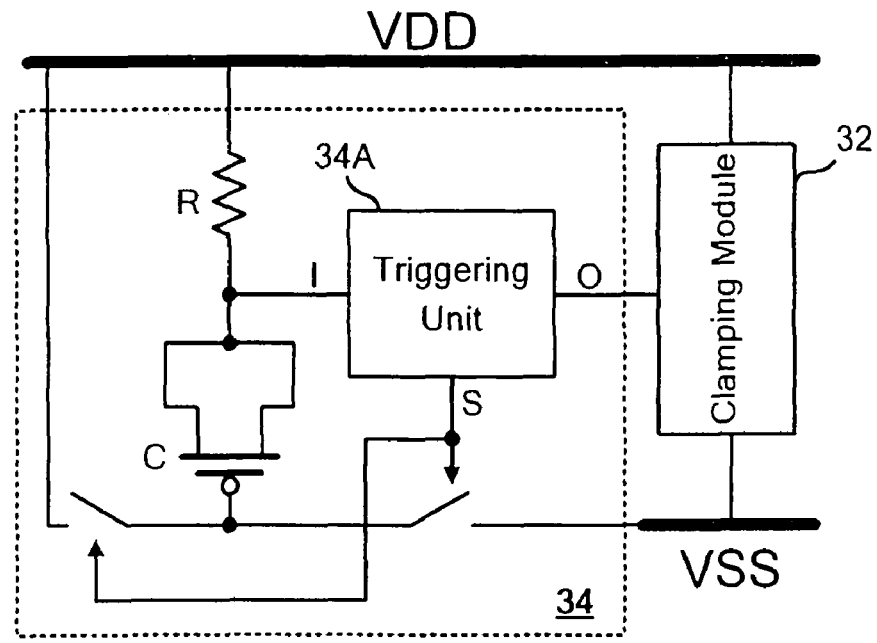
FIG. 3 illustrates an ESD protection circuit in an embodiment according to the invention.

Please refer to FIG. 3, which illustrates the ESD protection circuit in an embodiment according to the invention. This ESD protection circuit includes a clamping module 32 and a detecting module 34. As shown in FIG. 3, the clamping module 32 is coupled between a positive power line (VDD) and a negative power line (VSS). The detecting module 34 includes a triggering unit 34A, a resistor (R), and a gate oxide MOS capacitor (C).

The triggering unit 34A has an input terminal (I), an output terminal (O), and a switching terminal (S). The output terminal (O) is coupled to and used for triggering the clamping module 32. The resistor is coupled between VDD and the input terminal (I). A first end of the capacitor is also coupled to the input terminal (I), and a second end of the capacitor is selectively coupled VDD or VSS.

In this embodiment, the thin gate oxide MOS capacitor is a PMOS with its gate terminal as the second end; the source, drain and bulk terminals of the PMOS are coupled together as the first end. In other applications, the PMOS can be replaced by an NMOS with its gate terminal as the first end; the source, drain and bulk terminals of the NMOS are both the second end.

Figure 1:
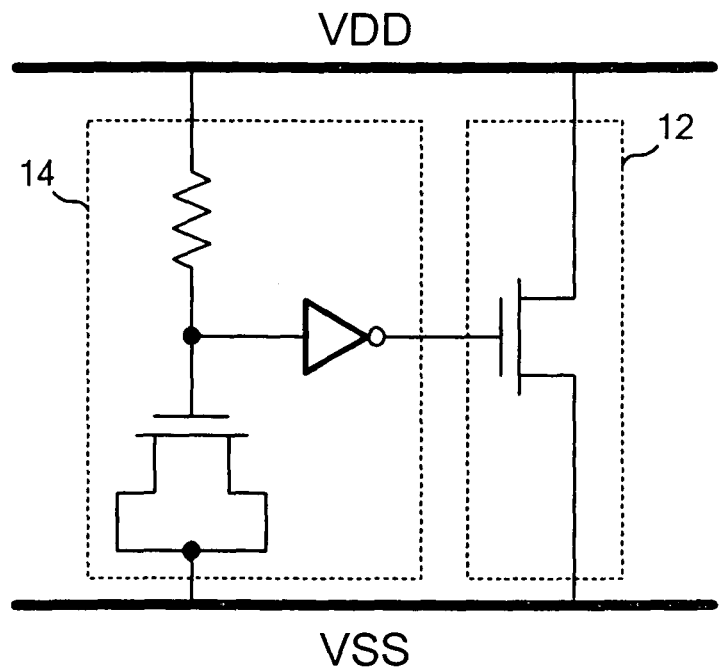
FIG. 1 and FIG. 2 show ESD circuits disclosed in prior arts.
Figure 2:
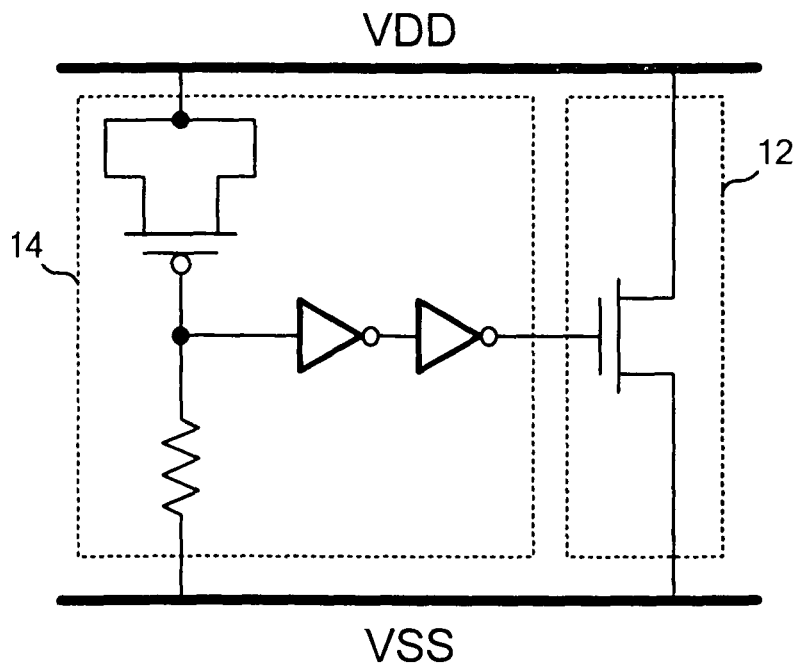

According to the invention, in an ESD event, the switching terminal (S) enables the second end of the capacitor to be coupled with VSS. Thereby, the capacitor and the resistor are connected in series between VDD/VSS and function as the RC combination in FIG. 1.

On the contrary, during normal power operations, the switching terminal (S) enables the second end of the capacitor to be coupled with VDD. In this configuration, both ends of the capacitor are substantially coupled to VDD. Hence, there is nearly no gate tunneling leakage through the capacitor. Further, since the voltage at the input terminal (I) will not be affected by gate tunneling leakage, and the problem of mistriggering is accordingly prevented.

FIG. 4(A) and FIG. 4(B) show exemplary embodiments of the detecting module 34. In these two examples, the triggering unit 34A is an inverter. The output end of the inverter is not only the output terminal (O) but also the switching terminal (S). In FIG. 4(A), the switches controlled by the switching terminal (S) respectively comprise an inverter and a transmission gate. In FIG. 4(B), the switch between VDD and the capacitor is a PMOS; the switch between VSS and the capacitor is an NMOS.

In actual applications, the triggering unit 34A can include more than one inverter; FIG. 5 illustrates a corresponding example. In this example, two more inverters are added between the switching terminal (S) and the clamping module 32. The function of the added inverters is to enhance the driving ability of the triggering unit 34A. As long as the number of the added inverters is an even number, the function of the triggering unit 34A is intrinsically the same.

Moreover, it can be seen the two MOSs functioning as switches in FIG. 5 are equivalent to an inverter. Therefore, the circuit in FIG. 5 can be further simplified into that shown in FIG. 6.

Please refer to FIG. 7, which shows another embodiment according to the invention. In this embodiment, the detecting module 34 includes a resistor (R), a capacitor (C), a PMOS (MP), an NMOS (MN), and an inverter. During normal power operations, the gate terminal of MN has a high voltage level. Accordingly, the drain terminal of MN has a low voltage level and the clamping device 32 is turned off. Further, the output end of the inverter has a high voltage level. Thereby, both ends of the capacitor are substantially connected to VDD. As explained above, gate tunneling leakage through the capacitor is eliminated and mistriggering is prevented.

Please refer to FIG. 8, which illustrates the ESD protection circuit in another embodiment according to the invention. The main difference between the ESD protection circuits in FIG. 8 and FIG. 3 is the configuration of the resistor and the capacitor. In FIG. 8, the resistor is coupled between VSS and the input terminal (I) of the triggering unit 84A. A first end of the capacitor in FIG. 8 is coupled to the input terminal (I), and a second end of the capacitor is selectively coupled VDD or VSS.

Similarly, during normal power operations, the switching terminal enables the second end of the capacitor to be coupled with VSS. In an ESD event, the switching terminal enables the second end of the MOS capacitor to be coupled with VDD. In this configuration, both ends of the capacitor are substantially coupled to VSS during normal power operations. Hence, there is nearly no gate tunneling leakage through the capacitor.

FIG. 9(A) and FIG. 9(B) show exemplary embodiments of the detecting module 84. In these two examples, the triggering unit 84A includes two inverters (A1 and A2). The output end of the inverter A2 is the output terminal (O). The output end of the inverter A1 is the switching terminal (S). In FIG. 9(A), the switches controlled by the switching terminal (S) respectively comprise an inverter and a transmission gate. In FIG. 9(B), the switch between VDD and the capacitor is a PMOS; the switch between VSS and the capacitor is an NMOS.

Moreover, it can be seen the two MOSs functioning as switches in FIG. 9(B) are equivalent to an inverter. Therefore, the circuit in FIG. 9(B) can be further simplified into that shown in FIG. 10.

According to the invention, the thin gate oxide MOS capacitor in the ESD detecting unit is coupled to different power lines during normal power operation and in an ESD event. Because the two ends of the capacitor are substantially coupled to the same power line, the problems of gate tunneling leakage and mistriggering can be effectively prevented.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An electrostatic discharge (ESD) protection circuit, comprising:
   a clamping module coupled between a positive power line and a negative power line; and
   a detecting module, comprising:
   a triggering unit having an input terminal, an output terminal, and a switching terminal, the output terminal being coupled to and used for triggering the clamping module;
   a resistor coupled between the positive power line and the input terminal of the triggering unit; and
   a MOS capacitor having a first end and a second end, the first end being coupled to the input terminal of the triggering unit, the second end being enabled by the switching terminal of the triggering unit to selectively couple with the positive power line or the negative power line according to whether an ESD event occurs.

2. The ESD protection circuit of claim 1, wherein the triggering unit comprises:
   a first inverter having an input end and an output end, the input end being the input terminal of the triggering unit, the output end being the output terminal and the switching terminal of the triggering unit;
   a first switch controlled by the switching terminal and coupled between the MOS capacitor and the negative power line; in the ESD event, the first switch being switched to couple the second end of the MOS capacitor with the negative power line; and
   a second switch controlled by the switching terminal and coupled between the MOS capacitor and the positive power line; during the normal power operation, the second switch being switched to couple the second end of the MOS capacitor with the positive power line.

3. The ESD protection circuit of claim 2, wherein the first switch and the second switch respectively comprise a transmission gate and a second inverter.

4. The ESD protection circuit of claim 2, wherein the first switch comprises an NMOS; the second switch comprises a PMOS.

5. The ESD protection circuit of claim 2, wherein the triggering unit further comprises M second inverters coupled between the output end of the first inverter and the clamping module, and M is an even positive number.

6. The ESD protection circuit of claim 1, wherein the MOS capacitor is a PMOS, a gate terminal of the PMOS is the second end; a source terminal and a drain terminal of the PMOS are coupled together as the first end.

7. The ESD protection circuit of claim 1, wherein the MOS capacitor is an NMOS, a gate terminal of the NMOS is the first end; a source terminal and a drain terminal of the NMOS are both the second end.

8. The ESD protection circuit of claim 1, wherein the triggering unit comprises:
   a PMOS, a gate terminal of the PMOS being coupled to the second end of the MOS capacitor, a source terminal of the PMOS being coupled to the positive power line, and a drain terminal of the PMOS being the output terminal and the switching terminal of the triggering unit;
   an NMOS, a gate terminal of the NMOS being the input terminal of the triggering unit, a source terminal of the NMOS being coupled to the negative power line, a drain terminal of the NMOS being coupled to the drain terminal of the PMOS; and
   an inverter having an input end and an output end, the input end being coupled to the drain terminal of the PMOS, the output end being coupled to the second end of the MOS capacitor.

9. The ESD protection circuit of claim 1, wherein the triggering unit comprises N serially coupled inverters, N is an odd positive number, an input end of the N inverters is the input terminal of the triggering unit, an output end of the N inverters is the output terminal of the triggering unit, an intermediate node of the N inverters is the switching terminal of the triggering unit, an output signal at the output terminal and a switching signal at the switching terminal are out of phase.

* * * * *